US011926121B1

(12) United States Patent
Yang

(10) Patent No.: US 11,926,121 B1
(45) Date of Patent: Mar. 12, 2024

(54) MULTIFUNCTION ELECTROMAGNETIC INDUCTION SEALING LINER

(71) Applicant: HI-JOINT TECHNOLOGIES CORPORATION, New Taipei (TW)

(72) Inventor: Yen-Wu Yang, New Taipei (TW)

(73) Assignee: HI-JOINT TECHNOLOGIES CORPORATION, New Taipei (TW)

( * ) Notice: Subject to any disclaimer, the term of this patent is extended or adjusted under 35 U.S.C. 154(b) by 0 days.

(21) Appl. No.: 17/975,634

(22) Filed: Oct. 28, 2022

(51) Int. Cl.
*G06K 19/077* (2006.01)
*B32B 7/12* (2006.01)
*B32B 15/085* (2006.01)
*B32B 15/09* (2006.01)
*B32B 15/20* (2006.01)
*G09F 3/03* (2006.01)

(52) U.S. Cl.
CPC ........... *B32B 15/20* (2013.01); *B32B 7/12* (2013.01); *B32B 15/085* (2013.01); *B32B 15/09* (2013.01); *G06K 19/07722* (2013.01); *G06K 19/07726* (2013.01); *G06K 19/07798* (2013.01); *G09F 3/0335* (2013.01); *B32B 2307/202* (2013.01); *B32B 2307/58* (2013.01); *B32B 2519/02* (2013.01)

(58) Field of Classification Search
None
See application file for complete search history.

(56) References Cited

U.S. PATENT DOCUMENTS

| | | | |
|---|---|---|---|
| 2020/0122897 A1* | 4/2020 | Yang | B65D 33/20 |
| 2021/0016924 A1* | 1/2021 | Yang | G08B 13/1463 |

* cited by examiner

*Primary Examiner* — Suezu Ellis

(57) ABSTRACT

A multifunction electromagnetic induction sealing liner includes, from top to bottom order, a composite function layer, an electromagnetic induction heating layer, and an adhesion layer combined together. The composite function layer includes, from top to bottom order, an information layer and a backing layer combined together. The information layer has therein an information chip and an antenna circuit electrically connected to the information chip. The composite function layer includes a grip portion, a primary cutting line and a secondary cutting line. The primary cutting line runs annularly and divides the composite function layer into an outer ring and an inner ring. The grip portion is disposed inside the inner ring and connected thereto. The secondary cutting line is disposed in the inner ring and connected to a lateral edge of the grip portion. The antenna circuit crosses the primary cutting line and/or the secondary cutting line.

17 Claims, 6 Drawing Sheets

MULTIFUNCTION ELECTROMAGNETIC INDUCTION SEALING LINER

BACKGROUND OF THE INVENTION

1. Field of the Invention

The present disclosure relates to packaging, and in particular to a multifunction electromagnetic induction sealing liner.

2. Description of the Related Art

According to the prior art, packages of some products come with information tags (usually RFID tags) for information to be read from and written to in order to perform functions, such as anti-counterfeiting, production history recording, logistics, and tracking. Conventional information tags are mostly directly affixed to the outside of a product container, and thus the information tags can be easily peeled off and reused. However, the information tags may be peeled off by unscrupulous persons and affixed to the container of a fake product for reuse, rendering the information tags unsafe to use. Therefore, it is necessary for the packaging industry to address the issue of improving the anti-counterfeiting function of information tags.

Furthermore, according to the prior art, container mouths of some products are sealed with electromagnetic induction sealing liners. Not only are the electromagnetic induction sealing liners firmly coupled to the container mouths, but it is also difficult for users to apply any force on the electromagnetic induction sealing liners. Therefore, the users often pierce the electromagnetic induction sealing liners with a sharp tool, such as a knife, in order to open the container mouths, though at the expense of ease of use. Moreover, after the electromagnetic induction sealing liners have been destroyed and the container mouths have been opened, the sealing effect achieved by closing off the container mouths again with container caps deteriorates. To maintain the sealing effect, O-rings are inserted into the container caps during a production process, adding to complexity and material cost of the production process.

BRIEF SUMMARY OF THE INVENTION

It is an objective of the present disclosure to provide a multifunction electromagnetic induction sealing liner, so as to improve the prior art.

In order to achieve the above and other objectives, the present disclosure provides a multifunction electromagnetic induction sealing liner comprising, from top to bottom order, a composite function layer, an electromagnetic induction heating layer, and an adhesion layer combined together. The composite function layer comprises, from top to bottom order, an information layer and a backing layer combined together, the information layer having therein an information chip and an antenna circuit electrically connected to the information chip. The composite function layer has a grip portion, a primary cutting line, and a secondary cutting line, with the primary cutting line running annularly to divide the composite function layer into an outer ring and an inner ring. The grip portion is disposed inside the inner ring and connected to the inner ring. The secondary cutting line is disposed in the inner ring and connected to a lateral edge of the grip portion, with the antenna circuit crossing the primary cutting line and/or the secondary cutting line.

The primary cutting line of the composite function layer is, for example, a continuous groove structure or is formed from primary notches spaced apart from each other.

The secondary cutting line of the composite function layer is, for example, a continuous groove structure or is formed from secondary notches spaced apart from each other.

The secondary cutting line and the primary cutting line of the composite function layer are connected or separated.

The grip portion of the composite function layer is separated from the electromagnetic induction heating layer.

The primary cutting line and the secondary cutting line of the composite function layer penetrate the information layer of the composite function layer.

The adhesion layer is made of, for example, polyethylene, polyethylene glycol terephthalate, polypropylene, or hot-melt adhesive, and the backing layer is, for example, plastic film, cardboard, foam board, or plastic board.

The electromagnetic induction heating layer is an aluminum foil layer or an aluminum-plastic film layer.

The information layer comprises a surface film, a base film, the information chip, and the antenna circuit, and both the information chip and the antenna circuit are sandwiched between the surface film and the base film.

The information chip is, for example, a Radio-Frequency Identification (RFID) chip, a Near Field Communication Identification (NFCID) chip, an Electro-Magnetic Identification EMID chip or an Ultra Wide-Band Identification (UWBID) chip.

According to the present disclosure, the multifunction electromagnetic induction sealing liner of the present disclosure seals a container mouth. To open the container mouth, a user removes a container cap from the container mouth, then grips the grip portion of the composite function layer, and pulls the grip portion upward. With the grip portion being connected to the inner ring, and the secondary cutting line being disposed in the inner ring and connected to a lateral edge of the grip portion, pulling the grip portion upward causes the severance of the secondary cutting line and the resultant severance of the inner ring. As a result, the inner ring moves upward to thereby cause the primary cutting line to sever, and thus the inner ring separates from the outer ring, allowing the inner ring to drive the separation of the electromagnetic induction heating layer from the adhesion layer. Thus, the electromagnetic induction heating layer and the overlap of the adhesion layer and the inner ring collectively separate from the container mouth in response to the upward movement of the inner ring, thereby opening the container mouth.

Therefore, the present disclosure enables users to easily open a container mouth without any tool. The present disclosure is also advantageous in that, after the container mouth has been opened, the outer ring, the electromagnetic induction heating layer, and the overlap of the adhesion layer and the inner ring stay with the container mouth. Then, when the container cap closes off the container mouth again, the container cap is in tight contact with the outer ring and thus closes off the container mouth, thereby optimizing the sealing effect. Furthermore, according to the present disclosure, an antenna circuit of an information layer crosses the primary cutting line and/or the secondary cutting line. Thus, the primary cutting line and the secondary cutting line sever when the container mouth is opened, and in consequence the antenna circuit of the information layer severs, leading to the destruction of the antenna circuit and the resultant loss of the information read/write function of the information layer.

Therefore, the information layer is destroyed as soon as the container mouth is opened, thereby improving the anti-counterfeiting function.

DETAILED DESCRIPTION OF THE INVENTION

Technical features of the present disclosure are herein illustrated with specific embodiments.

Figure 1:
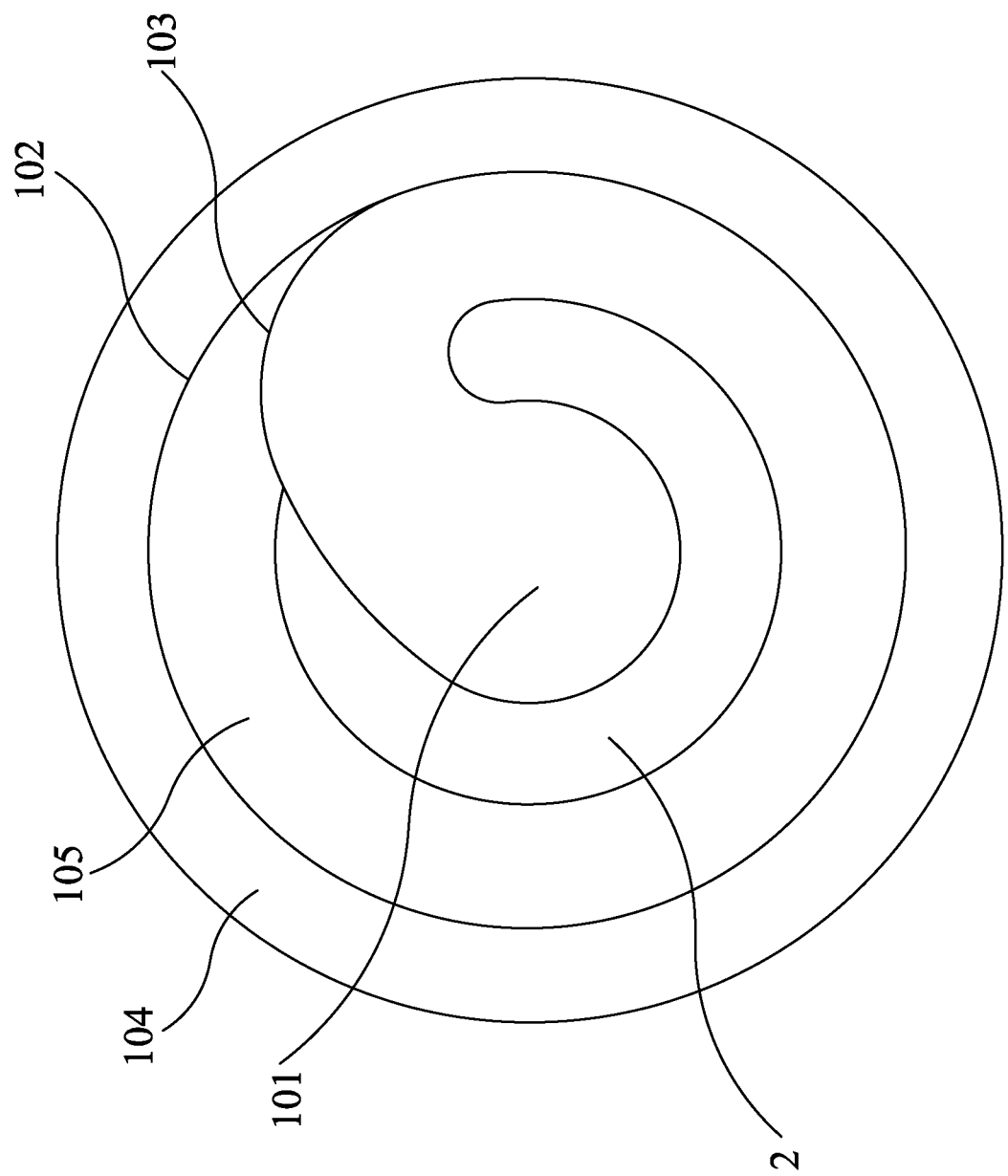
FIG. 1 is a top view of a multifunction electromagnetic induction sealing liner of an embodiment of the present disclosure.
Figure 2:
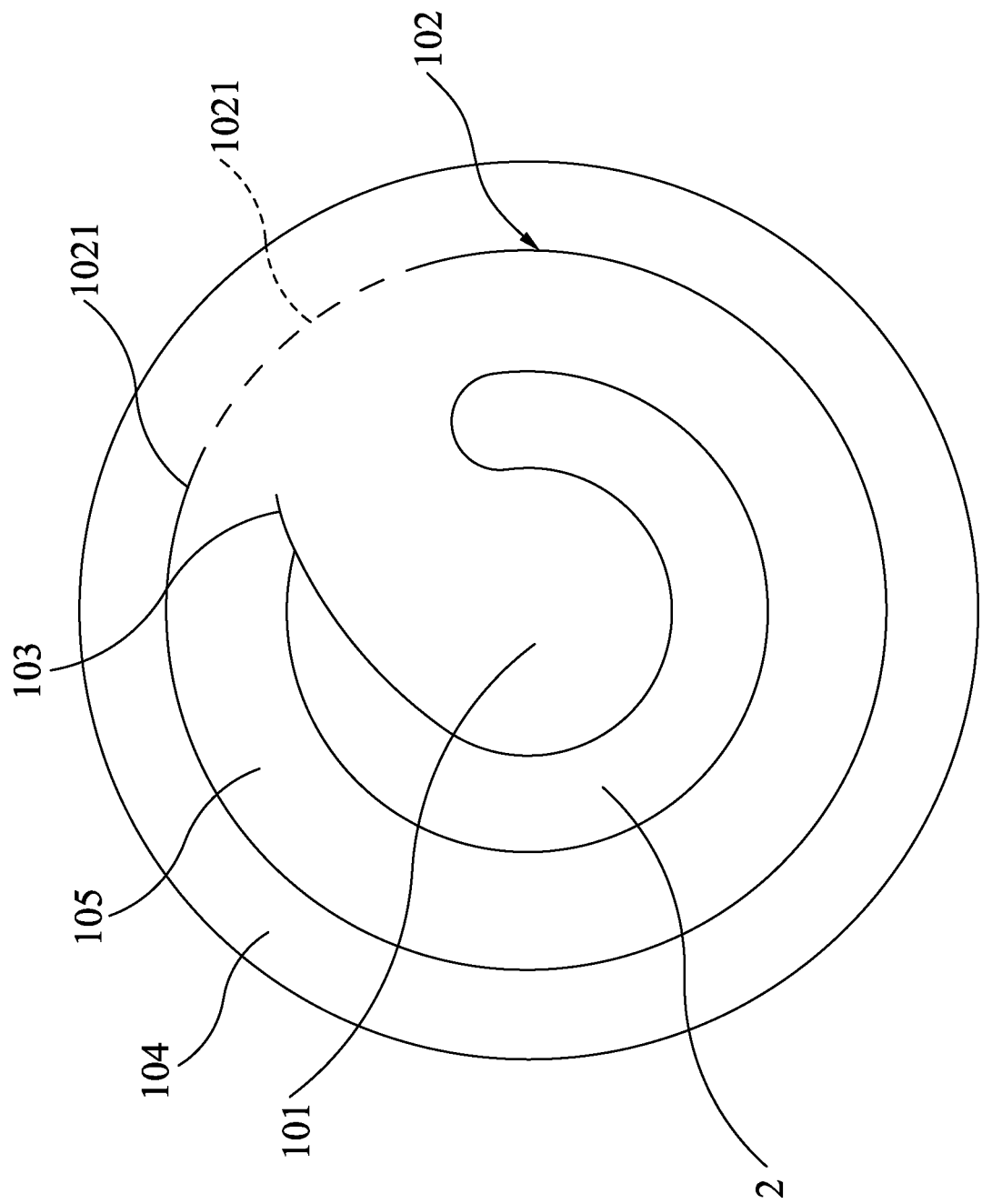
FIG. 2 is a top view of the multifunction electromagnetic induction sealing liner of an embodiment of the present disclosure.
Figure 3:
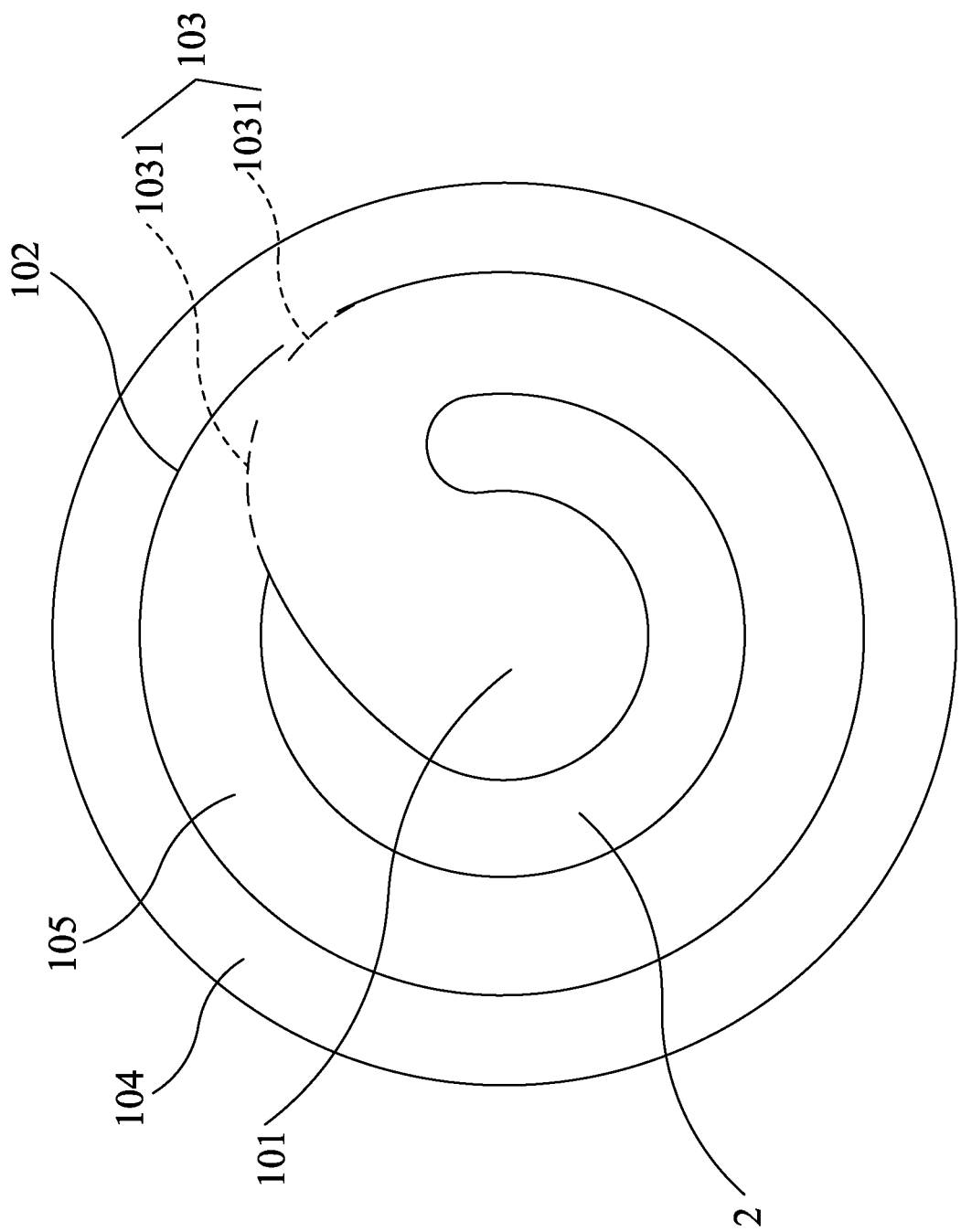
FIG. 3 is a top view of the multifunction electromagnetic induction sealing liner of an embodiment of the present disclosure.
Figure 4:
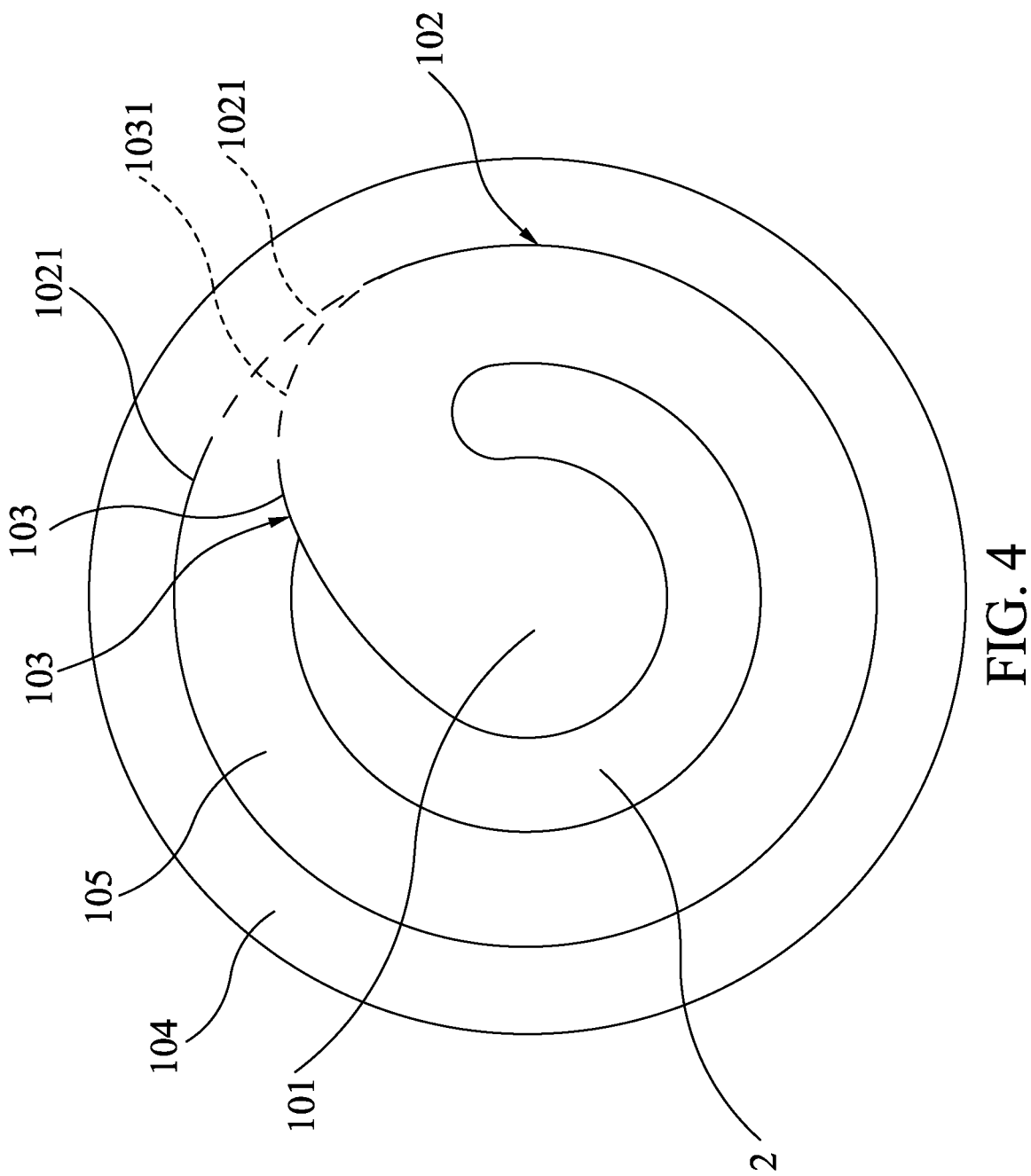
FIG. 4 is a top view of the multifunction electromagnetic induction sealing liner of an embodiment of the present disclosure.
Figure 5:
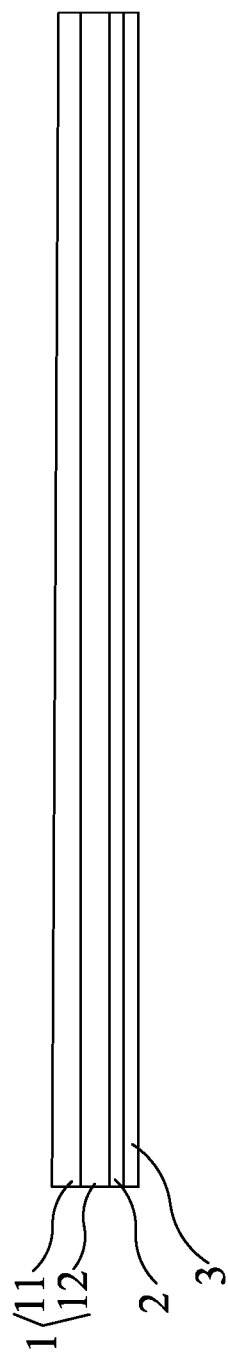
FIG. 5 is a side view of the multifunction electromagnetic induction sealing liner of an embodiment of the present disclosure.
Figure 6:
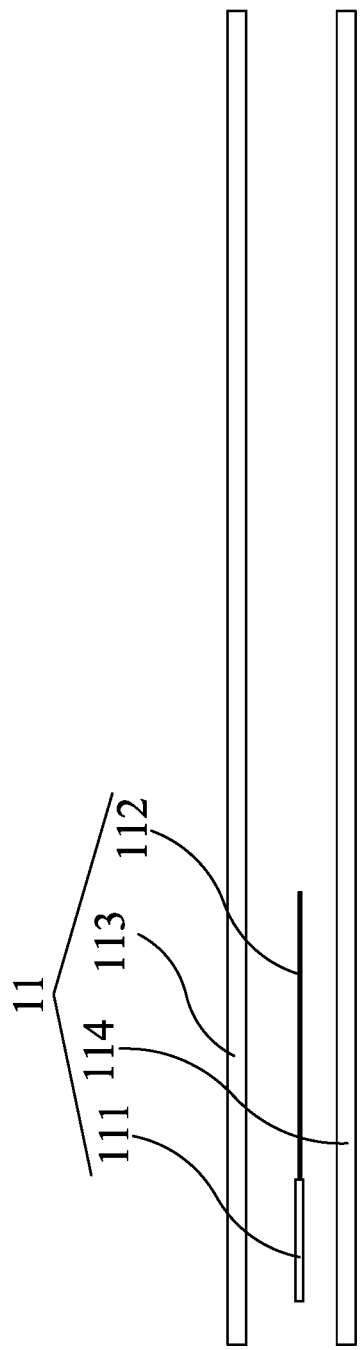
FIG. 6 is an exploded view of an information layer of an embodiment of the present disclosure.

Referring to FIG. 1 through FIG. 6, the present disclosure provides a multifunction electromagnetic induction sealing liner comprising, from top to bottom order, a composite function layer 1, an electromagnetic induction heating layer 2, and an adhesion layer 3 combined together. The composite function layer 1 comprises, from top to bottom order, an information layer 11 and backing layer 12 combined together. The information layer 11 has therein an information chip 111 and an antenna circuit 112 electrically connected to the information chip 111. Various production-related information is read from and written to the information layer 11 in order to track products. The backing layer 12 is adhered to the electromagnetic induction heating layer 2 with a composite adhesive.

The principle of sealing a container mouth with the multifunction electromagnetic induction sealing liner of the present disclosure is explained below. An electromagnetic field is generated with an electromagnetic induction sealing machine. Heat is generated by the electromagnetic induction heating layer 2 due to electromagnetic induction. The adhesion layer 3 is melted by the heat and thus adhered to the container mouth, allowing the multifunction electromagnetic induction sealing liner of the present disclosure to seal the container mouth.

Advantageous technical features of the present disclosure are described below. The composite function layer 1 comprises a grip portion 101, a primary cutting line 102, and a secondary cutting line 103. The primary cutting line 102 runs annularly and divides the composite function layer 1 into an outer ring 104 and an inner ring 105. The grip portion 101 is disposed inside the inner ring 105 and connected to the inner ring 105. The secondary cutting line 103 is disposed in the inner ring 105 and connected to a lateral edge of the grip portion 101. The antenna circuit 112 of the information layer 11 crosses the primary cutting line 102 and/or the secondary cutting line 103.

According to the present disclosure, to open the container mouth, a user removes a container cap from the container mouth, then grips the grip portion 101 of the composite function layer 1, and pulls the grip portion 101 upward. With the grip portion 101 being connected to the inner ring 105, and the secondary cutting line 103 being disposed in the inner ring 105 and connected to a lateral edge of the grip portion 101, pulling the grip portion 101 upward causes the severance of the secondary cutting line 103 and the resultant severance of the inner ring 105. As a result, the inner ring 105 moves upward to thereby cause the primary cutting line 102 to sever, and thus the inner ring 105 separates from the outer ring 104, allowing the inner ring 105 to drive the separation of the electromagnetic induction heating layer 2 from the adhesion layer 3. Thus, the electromagnetic induction heating layer 2 and the overlap of the adhesion layer 3 and the inner ring 105 collectively separate from the container mouth in response to the upward movement of the inner ring 105, thereby opening the container mouth. Therefore, the present disclosure enables users to easily open a container mouth without any tool. The present disclosure is also advantageous in that, after the container mouth has been opened, the outer ring 104, the electromagnetic induction heating layer 2, and the overlap of the adhesion layer 3 and the inner ring 105 stay with the container mouth. Then, when the container cap closes off the container mouth again, the container cap is in tight contact with the outer ring 104 and thus closes off the container mouth, thereby optimizing the sealing effect. Furthermore, according to the present disclosure, the antenna circuit 112 of the information layer 11 crosses the primary cutting line 102 and/or the secondary cutting line 103. Thus, the primary cutting line 102 and the secondary cutting line 103 sever when the container mouth is opened, and in consequence the antenna circuit 112 of the information layer 11 severs, leading to the destruction of the antenna circuit 112 and the resultant loss of the information read/write function of the information layer 11. Therefore, the information layer 11 is destroyed as soon as the container mouth is opened, thereby improving the anti-counterfeiting function. According to the present disclosure, the primary cutting line 102 and the secondary cutting line 103 of the composite function layer 1 are formed by, for example, mold micro-pressing, laser microdissection, or electron beam microdissection. The primary cutting line 102 and the secondary cutting line 103 of the composite function layer 1 penetrate the information layer 11 to render the inner ring 105 of the composite function layer 1 easy to sever. In an embodiment of the present disclosure, the primary cutting line 102 is a continuous groove structure and is a closed ring structure, whereas the secondary cutting line 103 is also a continuous groove structure, with the secondary cutting line 103 being connected to the primary cutting line 102 to thereby facilitate the severance of the inner ring 105 in response to the upward pull of the grip portion 101. In an embodiment of the present disclosure, the primary cutting line 102 is formed from primary notches 1021 spaced apart from each other, with the primary notches 1021 differing in dimensions, whereas the secondary cutting line 103 is a continuous groove structure and is separated from the primary cutting line 102. In an embodiment of the present disclosure, the primary cutting line 102 is a continuous groove structure and is an opened ring structure, whereas the secondary cutting line 103 is formed from secondary notches 1031 spaced apart from each other and being linear, with the secondary cutting line 103 being connected to the primary cutting line 102. In an embodiment of the present disclosure, the primary cutting line 102 is formed from the primary notches 1021 spaced apart from each other, with the primary notches 1021 differing in dimensions, whereas the secondary cutting line 103 is formed from the secondary notches 1031 spaced apart from each other, with the secondary notches 1031 differing in dimensions, with the secondary cutting line 103 being connected to the primary cutting line 102.

According to the present disclosure, the grip portion 101 of the composite function layer 1 is separated from the electromagnetic induction heating layer 2, allowing users to easily grip the grip portion 101. The grip portion 101 and the electromagnetic induction heating layer 2 adhere together slightly to not only prevent the grip portion 101 from warping but also allow the grip portion 101 to be easily peeled off and thus gripped by the user. According to the present disclosure, the grip portion 101 is a hollow-cored structure or a non-hollow-cored structure. When provided in the form of the hollow-cored structure, the grip portion 101 can be penetrated and firmly gripped by the human hand. The grip portion 101 is, for example, round, rectangular, ring-shaped, polygonal, or irregularly-shaped.

According to the present disclosure, the information layer 11 comprises a surface film 113, a base film 114, the information chip 111, and the antenna circuit 112, and both the information chip 111 and the antenna circuit 112 are sandwiched between the surface film 113 and the base film 114. The surface film 113 and the base film 114 are made of, for example, polyethylene, polyethylene glycol terephthalate, or polypropylene. The information chip 111 is, for example, a Radio-Frequency Identification (RFID) chip, a Near Field Communication Identification (NFCID) chip, an Electro-Magnetic Identification EMID chip or an Ultra Wide-Band Identification (UWBID) chip. The RFID chip, the NFCID chip, the EMID chip, and the UWBID chip are equally effective in performing an information read/write function with the antenna circuit 112. The antenna circuit 112 has a structurally weak region which renders the antenna circuit 112 easy to sever in response to the severance of the primary cutting line 102 and the secondary cutting line 103. The structurally weak region has small antenna dimensions and is thin, when compared to the antenna circuit 112 in its entirety. The structurally weak region may also be a region where the antenna material is likely to fracture or sever.

According to the present disclosure, the backing layer 12 is, for example, a plastic film, a cardboard, a foam board or a plastic board.

According to the present disclosure, the electromagnetic induction heating layer 2 is, for example, an aluminum foil layer or an aluminum-plastic film layer, and the aluminum foil layer or the aluminum-plastic film layer generates heat when exposed to a varying electromagnetic field.

According to the present disclosure, the adhesion layer 3 is made of, for example, polyethylene, polyethylene glycol terephthalate, polypropylene, or hot-melt adhesive, or is made of any other material, as long as the adhesion layer 3 adheres to the container mouth when heated up.

The aforesaid embodiments and accompanying drawings are not restrictive of the product forms and styles of the disclosure. Appropriate changes and modifications made by persons skilled in the art to the aforesaid embodiments and accompanying drawings shall be deemed to fall within the scope of the claims of the disclosure.

What is claimed is:

1. A multifunction electromagnetic induction sealing liner comprising, from top to bottom order:
    a composite function layer;
    an electromagnetic induction heating layer; and
    an adhesion layer;
    wherein the composite function layer comprises, from top to bottom order, an information layer and a backing layer combined together, the information layer having therein an information chip and an antenna circuit electrically connected to the information chip;
    wherein the composite function layer has a grip portion, a primary cutting line, and a secondary cutting line, with the primary cutting line running annularly to divide the composite function layer into an outer ring and an inner ring, the grip portion being disposed inside the inner ring and connected to the inner ring, the secondary cutting line being disposed in the inner ring and connected to a lateral edge of the grip portion, and with the antenna circuit crossing the primary cutting line and/or the secondary cutting line.

2. The multifunction electromagnetic induction sealing liner of claim 1, wherein the primary cutting line of the composite function layer is a continuous groove structure or is formed from primary notches spaced apart from each other.

3. The multifunction electromagnetic induction sealing liner of claim 2, wherein the secondary cutting line and the primary cutting line of the composite function layer are connected or separated.

4. The multifunction electromagnetic induction sealing liner of claim 2, wherein the grip portion of the composite function layer is separated from the electromagnetic induction heating layer.

5. The multifunction electromagnetic induction sealing liner of claim 2, wherein the primary cutting line and the secondary cutting line of the composite function layer penetrate the information layer of the composite function layer.

6. The multifunction electromagnetic induction sealing liner of claim 1, wherein the secondary cutting line of the composite function layer is a continuous groove structure or is formed from secondary notches spaced apart from each other.

7. The multifunction electromagnetic induction sealing liner of claim 6, wherein the secondary cutting line and the primary cutting line of the composite function layer are connected or separated.

8. The multifunction electromagnetic induction sealing liner of claim 6, wherein the grip portion of the composite function layer is separated from the electromagnetic induction heating layer.

9. The multifunction electromagnetic induction sealing liner of claim 6, wherein the primary cutting line and the secondary cutting line of the composite function layer penetrate the information layer of the composite function layer.

10. The multifunction electromagnetic induction sealing liner of claim 1, wherein the secondary cutting line and the primary cutting line of the composite function layer are connected or separated.

11. The multifunction electromagnetic induction sealing liner of claim 1, wherein the grip portion of the composite function layer is separated from the electromagnetic induction heating layer.

12. The multifunction electromagnetic induction sealing liner of claim 1, wherein the primary cutting line and the secondary cutting line of the composite function layer penetrate the information layer of the composite function layer.

13. The multifunction electromagnetic induction sealing liner of claim 1, wherein the adhesion layer is made of polyethylene, polyethylene glycol terephthalate, polypropylene, or hot-melt adhesive, and the backing layer is a plastic film, a cardboard, a foam board, or a plastic board.

14. The multifunction electromagnetic induction sealing liner of claim 1, wherein the electromagnetic induction heating layer is an aluminum foil layer or an aluminum-plastic film layer.

15. The multifunction electromagnetic induction sealing liner of claim 1, wherein the information layer comprises a surface film, a base film, the information chip, and the antenna circuit, and both the information chip and the antenna circuit are sandwiched between the surface film and the base film.

16. The multifunction electromagnetic induction sealing liner of claim 15, wherein the information chip is a radio-frequency identification (RFID) chip, a near field communication identification (NFCID) chip, an electro-magnetic identification (EMID) chip or an ultra wide-band identification (UWBID) chip.

17. The multifunction electromagnetic induction sealing liner of claim 1, wherein the information chip is a radio-frequency identification (RFID) chip, a near field communication identification (NFCID) chip, an electro-magnetic identification (EMID) chip or an ultra wide-band identification (UWBID) chip.

\* \* \* \* \*